(12) United States Patent
Sim et al.

(10) Patent No.: US 12,170,452 B2
(45) Date of Patent: Dec. 17, 2024

(54) CHARGING SYSTEM AND CHARGER FOR REDUCING INRUSH CURRENT

(71) Applicant: SAMSUNG SDI CO., LTD., Yongin-si (KR)

(72) Inventors: Sesub Sim, Yongin-si (KR); Jongsam Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 520 days.

(21) Appl. No.: 17/411,124

(22) Filed: Aug. 25, 2021

(65) Prior Publication Data
US 2022/0077706 A1    Mar. 10, 2022

(30) Foreign Application Priority Data

Sep. 4, 2020    (KR) .................. 10-2020-0113197

(51) Int. Cl.
*H02J 7/00*    (2006.01)
*H02H 9/00*    (2006.01)

(52) U.S. Cl.
CPC ......... *H02J 7/00304* (2020.01); *H02H 9/001* (2013.01); *H02J 7/0036* (2013.01)

(58) Field of Classification Search
CPC .................................................. H02J 7/00304
USPC ......................................................... 320/134
See application file for complete search history.

(56) References Cited

U.S. PATENT DOCUMENTS

| | | | |
|---|---|---|---|
| 5,583,417 A * | 12/1996 | Yuen ........................ | H02J 9/061 |
| | | | 320/DIG. 11 |
| 5,783,322 A | 7/1998 | Nagai et al. | |
| 7,196,911 B2 | 3/2007 | Takano et al. | |
| 7,365,515 B2 | 4/2008 | Takano et al. | |
| 8,937,461 B2 | 1/2015 | Park | |
| 9,466,860 B2 | 10/2016 | Noda et al. | |
| 9,716,399 B2 | 7/2017 | Chung et al. | |

(Continued)

FOREIGN PATENT DOCUMENTS

| | | |
|---|---|---|
| CN | 103107374 A | 5/2013 |
| EP | 2887492 A2 | 6/2015 |

(Continued)

OTHER PUBLICATIONS

Japanese Office action dated Aug. 29, 2022.

(Continued)

*Primary Examiner* — Edward Tso
*Assistant Examiner* — Ahmed H Omar
(74) *Attorney, Agent, or Firm* — Lee IP Law, P.C.

(57) ABSTRACT

A charging system includes a battery pack including at least one battery cell and a battery management module, and a charger including a connector configured to detect a connection with the battery pack, a communicator configured to communicate with the battery management module, and a controller configured to control charging of the battery pack. The controller of the charger is configured to output a wake-up voltage when the connection with the battery pack is detected through the connector, receive a value of a battery voltage from the battery management module through the communicator, determine a charging start voltage based on the value of the battery voltage, and start charging the battery pack after outputting the charging start voltage.

19 Claims, 6 Drawing Sheets

(56) References Cited

U.S. PATENT DOCUMENTS

| | | | |
|---|---|---|---|
| 2011/0163723 A1 | 7/2011 | Tan et al. | |
| 2011/0304299 A1* | 12/2011 | Yang | H02J 7/007182 |
| | | | 320/162 |
| 2015/0180244 A1 | 6/2015 | Jung et al. | |
| 2016/0064776 A1 | 3/2016 | Ro | |
| 2019/0237976 A1* | 8/2019 | Lau | H01M 10/48 |
| 2022/0094178 A1* | 3/2022 | Yamaguchi | H02J 7/0024 |

FOREIGN PATENT DOCUMENTS

| | | |
|---|---|---|
| JP | 06-014474 A | 1/1994 |
| JP | 09-140066 A | 5/1997 |
| JP | 3233034 B2 | 11/2001 |
| JP | 2004-187366 A | 7/2004 |
| JP | 2005-039919 A | 2/2005 |
| JP | 2007068264 A * | 3/2007 |
| JP | 2013-013184 A | 1/2013 |
| JP | 2013-102649 A | 5/2013 |
| JP | 2015-095936 A | 5/2015 |
| KR | 10-1192010 B1 | 10/2012 |
| KR | 10-2015-0127541 A | 11/2015 |

OTHER PUBLICATIONS

European Office action dated Aug. 28, 2023.
Chinese Office action dated Sep. 29, 2023.
European Search Report dated Jan. 31, 2022.

* cited by examiner

CHARGING SYSTEM AND CHARGER FOR REDUCING INRUSH CURRENT

CROSS-REFERENCE TO RELATED APPLICATION

This application is based on and claims priority under 35 U.S.C. § 119 to Korean Patent Application No. 10-2020-0113197, filed on Sep. 4, 2020, in the Korean Intellectual Property Office, the disclosure of which is incorporated by reference herein in its entirety.

BACKGROUND

1. Field

Embodiments relate to a charging system and a charger for reducing an inrush current.

2. Description of the Related Art

An inrush current is generated when a difference between a voltage of a charger and a voltage of a battery is great.

SUMMARY

Embodiments are directed to a charging system includes a battery pack including at least one battery cell and a battery management module, and a charger including a connector configured to detect a connection with the battery pack, a communicator configured to communicate with the battery management module, and a controller configured to control charging of the battery pack. The controller of the charger is configured to output a wake-up voltage when the connection with the battery pack is detected through the connector, receive a value of a battery voltage from the battery management module through the communicator, determine a charging start voltage based on the value of the battery voltage, and start charging the battery pack after outputting the charging start voltage.

The controller of the charger may be configured to output a charging current having a preset magnitude to the at least one battery cell when the battery pack starts being charged, and output a charging voltage having a preset magnitude to the battery pack.

The controller of the charger may be configured to determine the charging start voltage to be greater than the value of the battery voltage by a margin value that is set in advance.

The margin value may be set in advance based on a line resistance value to the at least one battery cell and a charging current value that is set in advance.

The battery management module may be inactivated when the at least one battery cell does not provide power to a load for a preset period of time and no power is received from the charger, and may be activated when the wake-up voltage is received.

The battery management module may be configured to detect a connection with the charger by receiving a signal transmitted from the communicator of the charger.

The battery pack may further include a switch configured to forcibly activate the battery management module.

When a charging stop condition is detected, the battery management module may be configured to transmit a charging stop signal requesting an output stop to the controller of the charger.

The controller of the charger may be configured to stop charging the battery pack when the charging stop signal is received, and when a release of the connection with the battery pack is detected and then a connection with another battery pack is detected again, the controller of the charger may be configured to output a voltage or a current to the battery pack or the other battery pack.

The controller of the charger may be configured to not charge the battery pack until release of the connection with the battery pack is detected after the charging stop signal is received, even though the battery pack is connected.

When the value of the battery voltage is less than the wake-up voltage, the controller of the charger may be configured to not start charging the battery pack.

According to another aspect of the present disclosure, a charger includes a connector configured to detect a connection with a battery pack including at least one battery cell, a communicator configured to communicate with a battery management module of the battery pack, and a controller configured to control charging of the battery pack, wherein the controller is configured to output a wake-up voltage when the connection with the battery pack is detected through the connector, receive a value of a battery voltage from the battery management module through the communicator, determine a charging start voltage based on the value of the battery voltage, and output the charging start voltage and start charging the battery pack.

The controller may be configured to output a charging current having a preset magnitude to the at least one battery cell when the battery pack starts being charged, and output a charging voltage having a preset magnitude to the battery pack.

The controller may be configured to determine the charging start voltage to be greater than the value of the battery voltage by a margin value that is set in advance.

The margin value may be set in advance based on a line resistance value to the at least one battery cell and a charging current value that is set in advance.

The controller may be configured to transmit a signal to the battery management module through the communicator to allow the battery management module to detect a connection with the charger.

The controller may be configured to stop charging the battery pack when a charging stop signal is received from the battery management module through the communicator, and when release of the connection with the battery pack is detected and then a connection with the battery pack or another battery pack is detected again, output a voltage or a current to the battery pack or the other battery pack.

The controller may be configured to not charge the battery pack until release of the connection with the battery pack is detected after the charging stop signal is received from the battery management module through the communicator, even though the battery pack is connected.

When the value of the battery voltage is less than the wake-up voltage, the controller may be configured to not start charging the battery pack.

BRIEF DESCRIPTION OF THE DRAWINGS

Features will become apparent to those of skill in the art by describing in detail example embodiments with reference to the attached drawings in which.

DETAILED DESCRIPTION

Figure 1:
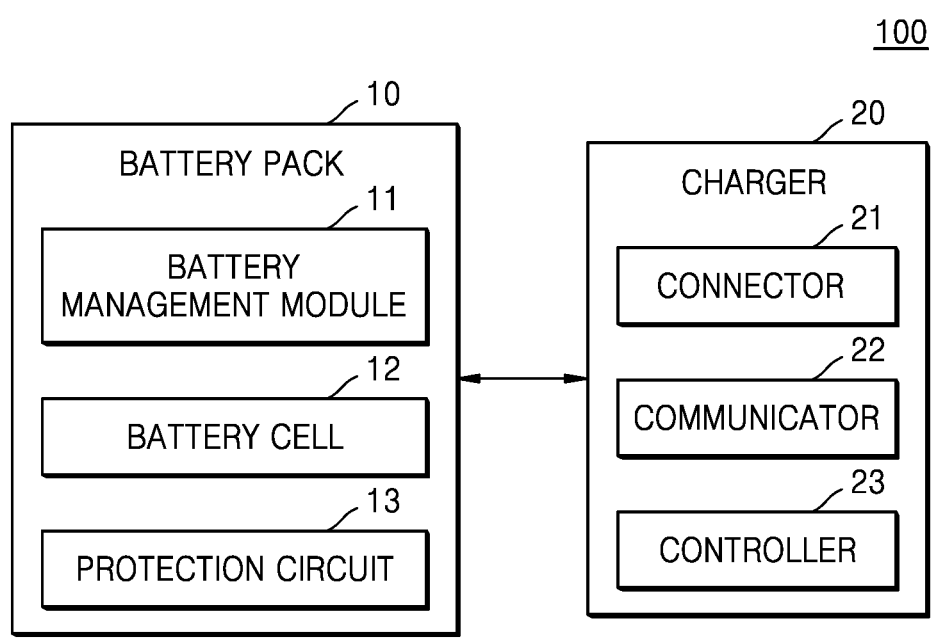
FIG. 1 illustrates an example of a structure of a charging system according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms comprises and/or comprising used herein specify the presence of stated features or components, but do not preclude the presence or addition of one or more other features or components.

It will be understood that when a region, a component, a unit, a block, or a module is referred to as being connected to another region, component, unit, block, or module, it can be directly or indirectly connected to the other region, component, unit, block, or module. That is, for example, intervening regions, components, units, blocks, or modules may be present.

For the sake of brevity, existing electronics, control systems, software, and other functional aspects of the systems may not be described in detail. Furthermore, the connecting lines or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential unless the element is specifically described as "essential" or "critical."

Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments are not limited to the described order of the steps. The use of any and all examples, or example language (e.g., "such as") provided herein, is intended merely to better illuminate the embodiments and does not pose a limitation on the scope of the embodiments unless otherwise claimed.

Figure 2:
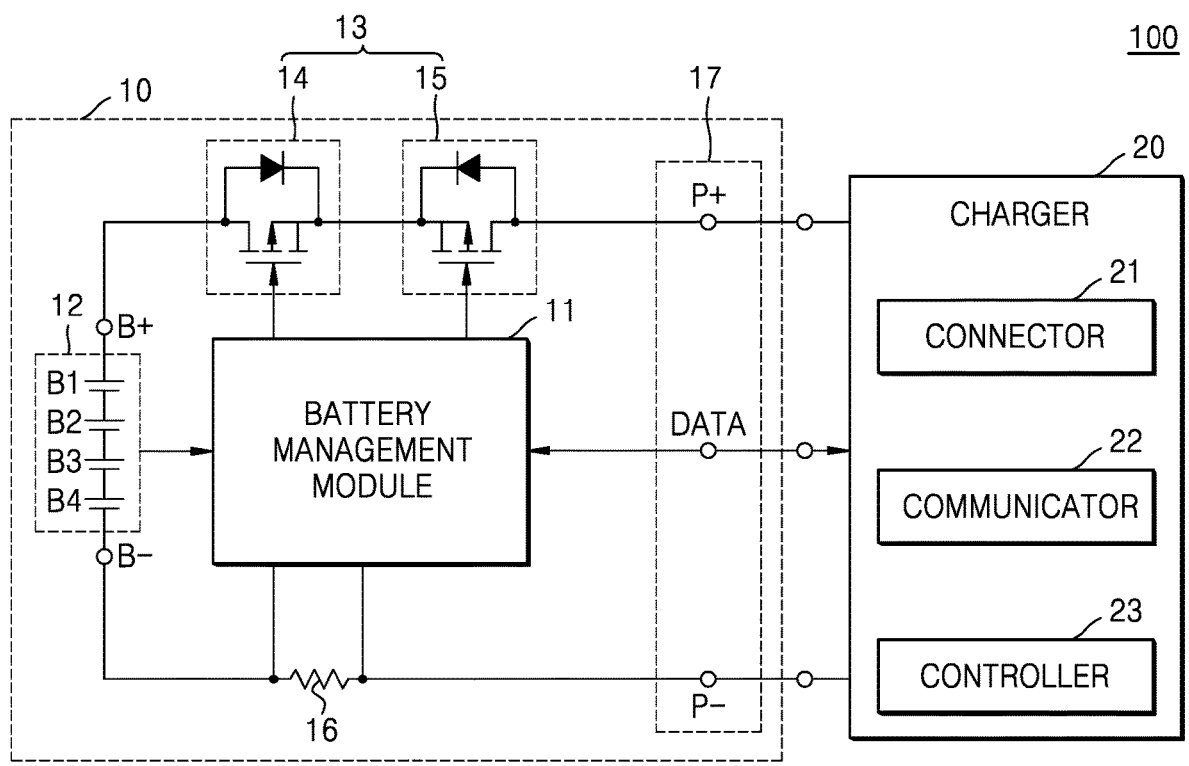
FIG. 2 is a circuit diagram of a battery pack 10 of the charging system 100, according to an example embodiment.

FIG. 1 illustrates an example of a structure of a charging system 100 according to an example embodiment. FIG. 2 is a circuit diagram of a battery pack 10 of the charging system 100, according to an example embodiment.

Referring to FIGS. 1 and 2, the charging system 100 may include the battery pack 10 and a charger 20. The battery pack 10 may include a battery management module 11, at least one battery cell 12, and a protection circuit 13. The battery management module 11 may detect a state (e.g., a voltage, a current, a temperature) of the battery cell 12, calculate a state of charge or charging capacity, and detect an abnormal state.

The charger 20 may include a connector 21, a communicator 22 performing a communication function, and a controller 23 controlling an output voltage and performing an output block function.

In various example embodiments, the battery pack 10 and the charger 20 may further include other components.

The battery pack 10 may be connected to the charger 20 through a connector 17 and may perform a charging operation of the at least one battery cell 12. Also, the battery pack 10 may be connected to an external load (not shown) through the connector 17 and may perform a discharging operation of the battery cell 12. A high current path between the battery cell 12 and the connector 17 may be used as a charging/discharging path. A power terminal of the charger 20 or the external load (not shown) may be connected to a first pack terminal P+ and a second pack terminal P− of the connector 17.

According to an example embodiment, the battery pack 10 and the charger 20 may include signal lines through which power and communication signals are exchanged between the battery pack 10 and the charger 20. For example, the communicator 22 (e.g., a communication terminal) of the charger 20 may be connected to a communication terminal DATA of the connector 17.

The battery cell 12 may include one or more batteries B1 to B4 and may be recharged or discharged at a certain voltage. B+ and B− of FIG. 2 respectively indicate a positive terminal B+ and a negative terminal B− of the battery cells B1 to B4 connected in series. The number of battery cells 12 may be varied according to the specifications of the external load.

The protection circuit 13 of the battery pack 10 may include a charging device 14 and a discharging device 15.

The battery management module 11 may detect a voltage of the battery cell 12, and control operations of the charging device 14 and the discharging device 15, thus controlling charging/discharging of the battery cell 12. For example, when the battery pack 10 and the charger 20 are connected to each other through the connector 17, the battery management module 11 may set the charging device 14 to be on and the discharging device 15 to be off, thereby allowing the battery cell 12 to be recharged. Also, when the battery pack 10 and an external system (not shown) are connected to each other through the connector 17, the battery management module 11 may set the charging device 14 to be off and the discharging device 15 to be on, thereby allowing the battery cell 12 to be discharged. The battery management module 11 may detect a voltage of each of the battery cells B1 to B4.

The charging device 14 and the discharging device 15 may be connected on the high-current path between the battery cell 12 and the connector 17, and may charge or discharge the battery cell 12. The charging device 14 may include a field effect transistor (hereinafter, referred to as FET1) and a parasitic diode (hereinafter, referred to as D1). The discharging device 15 may include a field effect transistor (hereinafter, referred to as FET2) and a parasitic diode (hereinafter, referred to as D2). A connection direction between a source and a drain of the FET1 may be opposite to that of the FET2. The FET1 having the above configuration may limit current flow from the connector 17 to the battery cell 12. The FET2 may limit current flow from the battery cell 12 to the connector 17. D1 and D2 may be configured to allow currents to flow in a direction opposite to a direction in which the current is limited.

The connector 17 may be connected to at least one battery cell 12, and may be connected to the charger 20 while the battery cell 12 is charged, thus functioning as a terminal for charging the battery cell 12. When the battery cell 12 is discharged, the connector 17 may be connected to the external load (not shown), and may function as a terminal for discharging the battery cell 12. The connector 17 may include the first pack terminal P+ and the second pack terminal P−. The first pack terminal P+ may be a positive pack terminal connected to the positive terminal B+ of the battery cell 12. The second pack terminal P− may be a negative pack terminal connected to the negative terminal B− of the battery cell 12. When the charger 20 is connected to the connector 17, the battery cell 12 may be charged by the charger 20, and when the external load is connected to the connector 17, the battery cell 12 may be discharged by the external load.

In an example embodiment, the connector 17 may include the communication terminal DATA connected to the battery management module 11. In an example embodiment, when the charger 20 is connected to the connector 17, the communication terminal DATA may enable communication between the battery management module 11 and the charger 20 (e.g., the communicator 22). For example, the communication terminal DATA may transmit voltage information, charging control information, etc. of the battery cell 12 to the charger 20 from the battery management module 11. For example, the communication terminal DATA may transmit, to the external system (not shown), an alarm signal, etc. that is output from the battery management module 11.

A sensor resistor 16 may be connected on the high current path between the battery cell 12 and the connector 17. In detail, for example, the sensor resistor 16 may be connected between the negative terminal B− of the battery cell 12 and the second pack terminal P−. Also, the sensor resistor 16 may be connected to the battery management module 11. Accordingly, the sensor resistor 16 may allow the battery management module 11 to identify voltage values of both ends of the sensor resistor 16 and a resistance value of the sensor resistor 16 and identify charging/discharging currents. Therefore, the sensor resistor 16 may transmit, to the battery management module 11, information regarding the charging current or the discharging current of the battery cell 12.

According to an example embodiment, the controller 23 of the charger 20 may detect the connection with the connector 17 through the connector 21. The connector 21 may include, for example, a connection terminal.

The controller 23 may transmit a certain communication signal to the battery pack 10 (e.g., the battery management module 11) while the connection with the battery pack 10 is detected through the connector 21, and may detect the connection between the battery pack 10 (e.g., the battery management module 11) and the charger 20. For example, while the charger 20 is connected to the battery pack 10, the controller 23 may transmit the certain communication signal through the communicator 22 in a certain cycle.

The controller 23 may control an output voltage of the charger 20. When the connection with the battery pack 10 is detected through the connector 21, the controller 23 may output a wake-up voltage at which the battery management module 11 is activated.

The controller 23 may receive a communication signal from the battery management module 11 through the communicator 22. According to an example embodiment, the controller 23 may receive, from the battery management module 11, a signal indicating a value of a battery voltage and a signal indicating whether the battery pack 10 is rechargeable, through the communicator 22. The value of the battery voltage may indicate a voltage value of at least one battery cell 12. The value of the battery voltage may indicate, for example, a value of a voltage between the positive terminal B+ and the negative terminal B− of the battery cells B1 to B4 connected in series.

The controller 23 may check the signals (e.g., the signals indicating the value of the battery voltage and whether the battery pack 10 is rechargeable) received through the communicator 22, and may output a charging start voltage when the battery cell 12 needs to be recharged. The charging start voltage may be determined by the controller 23 according to the value of the battery voltage. The charging start voltage may be, for example, greater than the wake-up voltage and less than a full charge voltage that is set in advance. The charging start voltage may be higher than the value of the battery voltage by a margin value. The margin value may be, for example, set in advance.

Then, the battery management module 11 switches the charging device 14 to be in an on state so that the charging current may start flowing. When the charging current starts flowing, the controller 23 of the charger 20 may output the preset charging current to the battery cell 12. Then, the controller 23 may output the preset charging voltage (e.g., the full charge voltage) to the battery pack 10.

The controller 23 may detect that the charging (of the battery pack 10) is prevented through the communicator 22, or when a charging stop signal is received from the battery management module 11, the controller 23 may stop outputting a current and/or a voltage.

For example, when the battery management module 11 detects a charging stop condition, the battery management module 11 may transmit an output stop signal of requesting an output stop to the controller 23 (through the communicator 22). For example, when the battery management module 11 detects that the battery pack 10 is fully charged, the charging stop signal may be transmitted to the controller 23. The controller 23 of the charger 20 may stop charging the battery pack 10 in response to the charging stop signal.

Once the charging stops, the controller 23 may not charge the battery pack 10 even though the battery pack 10 is connected to the charger 20 until release of connection with the battery pack 10 is detected through the connector 21. In other words, after receiving the charging stop signal, the controller 23 may not charge the battery pack 10 until the release of connection with the battery pack 10 is detected.

When a connection with the battery pack 10 or another battery pack is detected again through the connector 21 after the release of connection with the battery pack 10 is detected through the connector 21, the controller 23 may output the voltage or current to the connected battery pack.

The battery pack 10 may include a switch for forcibly activating the battery management module 11. For example, the switch may be used to activate or shut down the operation of the battery management module 11.

According to an example embodiment, while the battery pack 10 is not discharged and is not being charged, the battery management module 11 may be inactivated to protect the charging capacity. For example, the battery management module 11 may be inactivated when the battery cell 12 does not provide power to the load for a preset period of time and no power is provided from the charger 20. When receiving the wake-up voltage, the battery management module 11 may be activated.

The battery management module 11 may detect a connection with the charger 20 by receiving a signal from the communicator 22 of the charger 20. For example, the battery management module 11 may detect the connection with the charger 20 in response to a certain signal transmitted from the communicator 22 of the charger 20.

Figure 3:
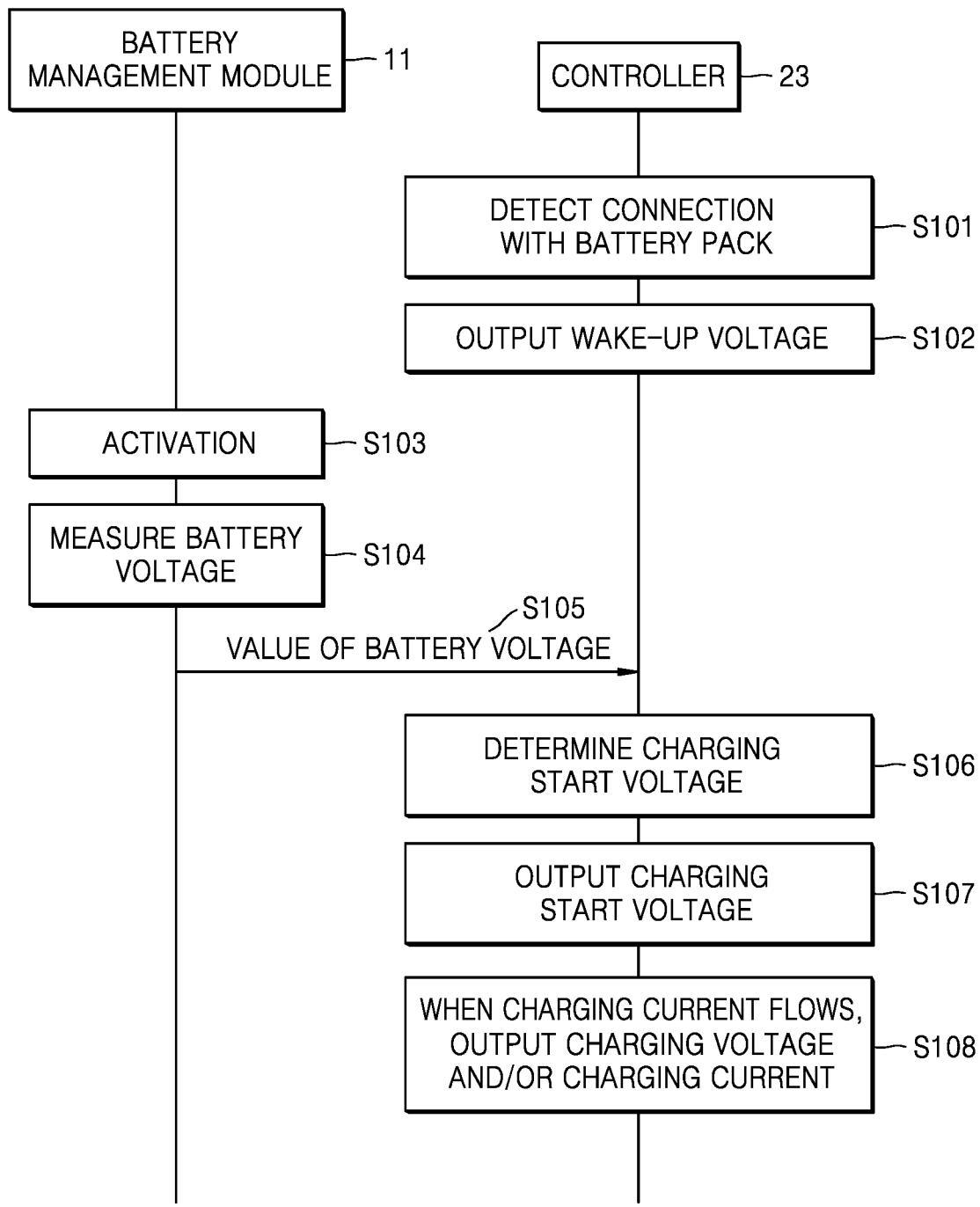
FIG. 3 illustrates an example of signal flow between a battery management module 11 of the battery pack 10 and a controller 23 of a charger 20, according to an example embodiment.
Figure 4:
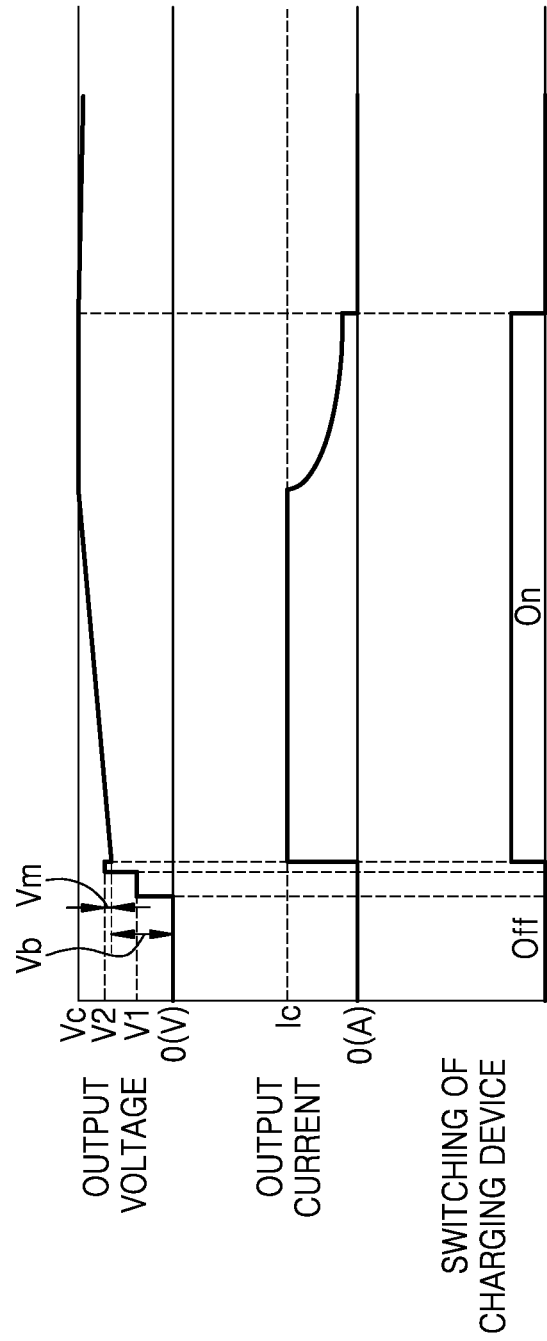
FIG. 4 is an example graph of an output voltage and an output current of the charger 20, according to an example embodiment.

FIG. 3 illustrates an example of signal flow between the battery management module 11 of the battery pack 10 and the controller 23 of the charger 20, according to an example embodiment. FIG. 4 is an example graph of an output voltage and an output current of the charger 20, according to an example embodiment. Hereinafter, descriptions will be provided with reference to FIGS. 3 and 4.

In operation S101, the controller 23 may use the connector 21 to detect the connection between the charger 20 and the battery pack 10.

In operation S102, the controller 23 may output a wake-up voltage V1 (see FIG. 4) in response to the detection of the connection with the battery pack 10. For example, the controller 23 may control a circuit to enable the charger 20 to output the wake-up voltage V1.

In operation S103, the battery management module 11 may be activated in response to the reception of the wake-up voltage V1.

In operation S104, the battery management module 11, which is activated, may measure a voltage of the battery cell 12. For example, the battery management module 11 may measure a value of a series voltage between the positive terminal B+ and the negative terminal B− of at least one battery cell.

In operation S105, the battery management module 11 may transmit, to the controller 23 of the charger 20, a signal indicating the measured value of the battery voltage. For example, the battery management module 11 may transmit, to the controller 23, data indicating the battery voltage value through the communication terminal DATA of the connector 17. The controller 23 of the charger 20 may receive the value of the battery voltage through the communicator 22 (e.g., the communication terminal).

In operation S106, the controller 23 may determine a charging start voltage V2 based on the value of the battery voltage. The charging start voltage V2 may be a voltage that is output when the battery pack 10 starts being charged or output to start charging the battery pack 10.

Referring to FIG. 4, the charging start voltage V2 may be higher than a value Vb of the battery voltage by a margin value Vm. The margin value Vm may be, for example, set in advance. The margin value Vm may be set in advance, based on a line resistance value and a charging current value that is set in advance. For example, the margin value Vm may set to be a value obtained by multiplying a preset charging current by a value of a line resistance from the charger 20 to the battery cell 12. The charging start voltage V2 may be higher than the wake-up voltage V1 and less than a full charge voltage Vc.

In operation S107, the controller 23 may output the determined charging start voltage V2. Although not illustrated, the battery management module 11 may allow the charging current to flow by switching the charging device 14 to be in the on state. For example, when the charging start voltage V2 is received from the charger 20, the battery management module 11 may switch the charging device 14 to be in the on state, and thus, the charging current may flow because of the switching.

In operation S108, the controller 23 may output the charging voltage and/or the charging current according to the flow of the charging current, and may start charging the battery pack 10. For example, the controller 23 may start charging the battery pack 10 by outputting the charging start voltage V2. For example, the controller 23 may output the charging voltage or the charging current according to the flow of the charging current.

According to an example embodiment, the controller 23 may output, to the battery cell 12, a charging current Ic having a preset magnitude. Then, the controller 23 may output, to the battery pack 10, a charging voltage Vc that is set in advance.

Referring to a switching graph of the charging device 14 of FIG. 4, when full charging is detected, the battery management module 11 may switch the charging device 14 to be in an off state.

Also, although not illustrated, when detecting the charging stop condition, the battery management module 11 may transmit a charging stop signal requesting an output stop to the controller 23 (e.g., through the communicator 22). For example, when detecting the full charging as the charging stop condition, the battery management module 11 may transmit the output stop signal to the controller 23.

Also, when receiving the charging stop signal, the controller 23 may stop charging the battery pack 10. For example, when receiving the charging stop signal, the controller 23 may not output the charging voltage or the charging current.

Figure 5:
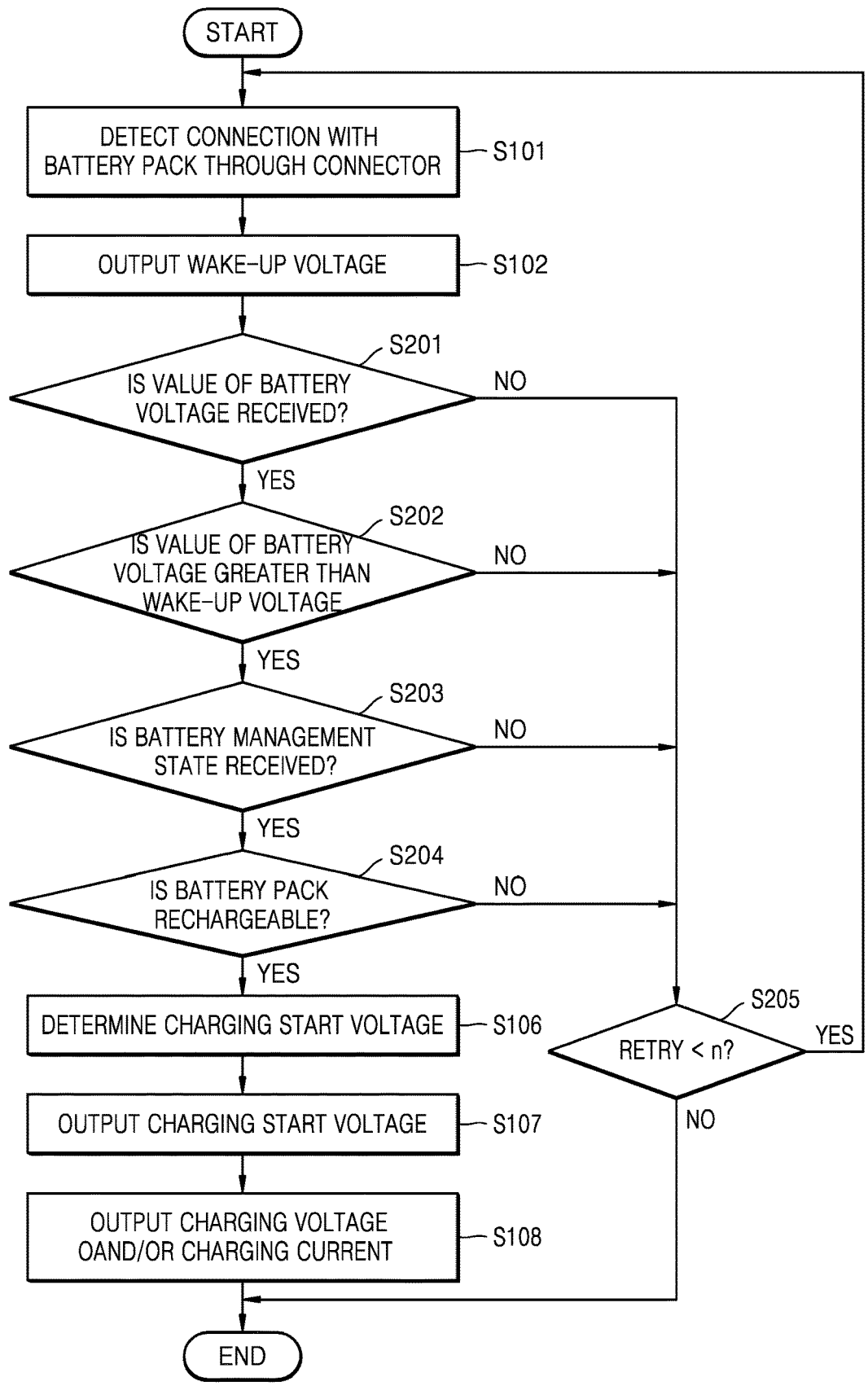
FIG. 5 illustrates an example of operation of the controller 23 of the charger 20, according to an example embodiment.

FIG. 5 illustrates an example of operation of the controller 23 of the charger 20, according to an example embodiment. FIG. 5 illustrates a detailed example of the operation of the controller 23 of FIG. 3. Also, operations S101, S102, S106, S107, and S108 of FIG. 5 may respectively correspond to operations of the same number of FIG. 3, and thus, detailed descriptions thereof are omitted.

In operation S101, the controller 23 may detect the connection between the charger 20 and the battery pack 10 through the connector 21.

In operation S102, the controller 23 may output the wake-up voltage V1 in response to the detection of the connection with the battery pack 10 (see FIG. 4). According to an example embodiment, it may take several milliseconds (ms) for the battery management module 11 to receive the wake-up voltage V1 and be activated.

In operation S201, through the communicator 22, the controller 23 may detect whether the value of the battery voltage is received from the battery management module 11. According to an example embodiment, the controller 23 may identify whether the value of the battery voltage is received for a certain period of time. For example, the certain period of time may be set as a time taken to activate the battery management module 11. For example, the certain period of time may be several to tens of milliseconds (ms). When the value Vb of the battery voltage is not received in operation S201, the controller 23 may proceed with operation S205, and when the number of retries is less than a designated number n, the controller 23 may retry. For example, the retry may indicate that operations may start again from operation S101.

When the value Vb of the battery voltage is received within a certain period of time in operation S201, the controller 23 may proceed with operation S202 and may determine whether the value Vb of the battery voltage is greater than the wake-up voltage V1. When the battery cell 12 is normal, the value Vb of the battery voltage may be greater than the wake-up voltage V1.

When the value Vb of the battery voltage is less than the wake-up voltage V1, the controller 23 may proceed with operation S205, and when the number of retries is less than the designated number n, the controller 23 may retry. When the number of retries is equal to or greater than the designated number n (for example, three times), the controller 23 may not start charging the battery pack 10. That is, the controller 23 may not output the charging start voltage, the charging voltage, or the charging current. Therefore, when the value Vb of the battery voltage is less than the wake-up voltage V1, the controller 23 may not start charging the battery pack 10.

When the value Vb of the battery voltage is greater than the wake-up voltage V1 in operation S202, the controller 23 may proceed with operation S203 and may detect whether state information of the battery management module 11 is received from the battery management module 11. For example, the controller 23 may use the communicator 22 to detect whether the state information of the battery management module 11 is received within a certain period of time. The state information may include, for example, state information of the battery cell 12. The state information may include, for example, signals indicating whether the battery pack 10 is rechargeable.

For example, when the state information is not received within the certain period of time, the controller 23 may proceed with operation S205. When the number of retries is less than the designated number n, the controller 23 may retry, for example, from operation S101. When the number of retries is equal to or greater than the designated number n, the controller 23 may not start charging the battery pack 10.

When the state information of the battery management module 11 is received within a certain period of time, the controller 23 may proceed with operation S204 and detect whether the battery pack 10 is rechargeable. Based on the received state information, the controller 23 may detect whether the battery pack 10 is rechargeable.

When the state information indicates that it is impossible to recharge the battery pack 10, the controller 23 may proceed with operation S205, and when the number of retrials is less than the designated number n (e.g., three times), the controller 23 may retry. When the number of retries is equal to or greater than the designated number n, the controller 23 may not start charging the battery pack 10.

When the state information indicates that the battery pack 10 is rechargeable, the controller 23 may proceed with operation S106 and may determine the charging start voltage V2.

In operation S107, the controller 23 may output the determined charging start voltage V2. For example, the battery management module 11 may allow the charging current to flow by switching the charging device 14 to be in the on state, based on the reception of the charging start voltage V2.

In operation S108, the controller 23 may start charging the battery pack 10. According to an example embodiment, the controller 23 may output the preset charging current Ic based on the detection of the flow of the charging current and then may output a preset charging voltage Vc.

Orders of operations S201 to S204 and S106 are not limited to the stated order. For example, the above order may change, and the operations may be performed in parallel or independently.

Figure 6:
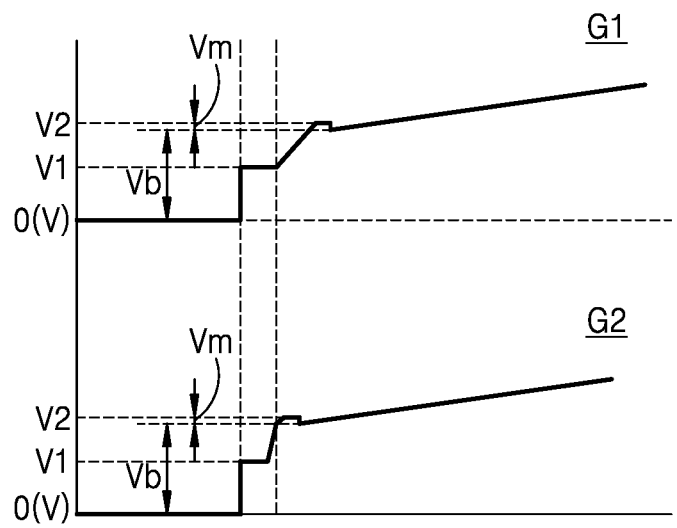
FIG. 6 illustrates example graphs G1 and G2 of an output voltage of the charger 20, according to various example embodiments.

FIG. 6 illustrates an example of graphs G1 and G2 of an output voltage of the charger 20, according to various example embodiments.

Referring to Graph G1, the controller 23 of the charger 20 may receive the value Vb of the battery voltage from the battery management module 11 while the wake-up voltage V1 is output, and may gradually increase the output voltage to the output start voltage V2 during a certain period of time. The controller 23 may stabilize an initial output voltage of the charger 20 by gradually increasing an output from the wake-up voltage V1 to the output start voltage V2.

Referring to Graph G2, the controller 23 of the charger 20 according to another example embodiment may receive the value Vb of the battery voltage while the wake-up voltage V1 is output, and then may increase the output voltage to the output start voltage V2 in a short period. For example, the controller 23 may output a first voltage, which is lower than the output start voltage V2, in a short period, and then may gradually increase a voltage from the first voltage to the output start voltage V2. For example, the controller 23 may output a maximum voltage, which may be controlled in the output start voltage V2 in the short period, and then may gradually increase the output voltage to the output start voltage V2. The charger 20 may shorten a time taken to stabilize the initial output voltage.

By way of summation and review, to decrease the inrush current generated because of an output from the charger, there are methods of designing a circuit, for example, adding a capacitor, or using a circuit component having a large rating. However, when an output voltage or an output current of the charger is great, a size of a circuit component for reducing the inrush current increases.

According to the one or more embodiments, an inrush current may be reduced by controlling an output voltage of a charger. Also, a rating of a circuit component for lowering an inrush current may decrease in a charging system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A charging system, comprising:
    a battery pack including at least one battery cell and a switch connected in series between first and second pack terminals, and a battery management module connected to a data terminal; and a charger including a connector configured to detect a connection with the battery pack, a communicator configured to communicate with the battery management module through the data terminal, and a controller configured to control charging of the battery pack through the first and second pack terminals, wherein the controller of the charger is configured to:

output a wake-up voltage between the first and second pack terminals to activate the battery management module when the connection with the battery pack is detected through the connector;

receive data indicating a value of a battery voltage from the battery management module through the communicator;

determine a charging start voltage based on the value of the battery voltage;

output the charging start voltage between the first and second pack terminals; and start charging the battery pack by the switch being turned on by the battery management module after outputting the charging start voltage.

2. The charging system as claimed in claim 1, wherein the controller of the charger is configured to output a charging current having a preset magnitude to the at least one battery cell when the battery pack starts being charged, and output a charging voltage having a preset magnitude to the battery pack.

3. The charging system as claimed in claim 1, wherein the controller of the charger is configured to determine the charging start voltage to be greater than the value of the battery voltage by a margin value that is set in advance.

4. The charging system as claimed in claim 3, wherein the margin value is set in advance based on a line resistance value to the at least one battery cell and a charging current value that is set in advance.

5. The charging system as claimed in claim 1, wherein:

the battery management module is inactivated when the at least one battery cell does not provide power to a load for a preset period of time and no power is received from the charger, and the battery management module is activated when the wake-up voltage is received.

6. The charging system as claimed in claim 1, wherein the battery management module is configured to detect a connection with the charger by receiving a signal transmitted from the communicator of the charger.

7. The charging system as claimed in claim 1, wherein the battery pack further includes a switch configured to forcibly activate the battery management module.

8. The charging system as claimed in claim 1, wherein the battery management module is configured to, when a charging stop condition is detected, transmit a charging stop signal requesting an output stop to the controller of the charger.

9. The charging system as claimed in claim 8, wherein the controller of the charger is configured to stop charging the battery pack when the charging stop signal is received, and, when a release of the connection with the battery pack is detected and then a connection with the battery pack or another battery pack is detected again, output a voltage or a current to the battery pack or the other battery pack.

10. The charging system as claimed in claim 8, wherein the controller of the charger is configured to not charge the battery pack until release of the connection with the battery pack is detected after the charging stop signal is received, even though the battery pack is connected.

11. The charging system as claimed in claim 1, wherein the controller of the charger is configured to not start charging the battery pack, when the value of the battery voltage is less than the wake-up voltage.

12. A charger, comprising:

a connector configured to detect a connection with a battery pack including at least one battery cell and a switch connected in series between first and second pack terminals;

a communicator configured to communicate with a battery management module of the battery pack through the data terminal; and a controller configured to control charging of the battery pack, wherein the controller is configured to:

output a wake-up voltage between the first and second pack terminals to activate the battery management module when the connection with the battery pack is detected through the connector;

receive data indicating a value of a battery voltage from the battery management module through the communicator;

determine a charging start voltage based on the value of the battery voltage;

output the charging start voltage between the first and second pack terminals; and start charging the battery pack by the switch being turned on by the battery management module after outputting the charging start voltage.

13. The charger as claimed in claim 12, wherein the controller is configured to output a charging current having a preset magnitude to the at least one battery cell when the battery pack starts being charged, and output a charging voltage having a preset magnitude to the battery pack.

14. The charger as claimed in claim 12, wherein the controller is configured to determine the charging start voltage to be greater than the value of the battery voltage by a margin value that is set in advance.

15. The charger as claimed in claim 14, wherein the margin value is set in advance based on a line resistance value to the at least one battery cell and a charging current value that is set in advance.

16. The charger as claimed in claim 12, wherein the controller is configured to transmit a signal to the battery management module through the communicator to allow the battery management module to detect a connection with the charger.

17. The charger as claimed in claim 12, wherein the controller is configured to:

stop charging the battery pack when a charging stop signal is received from the battery management module through the communicator; and, when release of the connection with the battery pack is detected and then a connection with the battery pack or another battery pack is detected again, output a voltage or a current to the battery pack or the other battery pack.

18. The charger as claimed in claim 17, wherein the controller is configured to not charge the battery pack until release of the connection with the battery pack is detected after the charging stop signal is received from the battery management module through the communicator, even though the battery pack is connected.

19. The charger as claimed in claim 12, wherein, the controller is configured to not start charging the battery pack, when the value of the battery voltage is less than the wake-up voltage.

* * * * *